United States Patent [19]
Fohl

[11] 4,136,841
[45] Jan. 30, 1979

[54] AUTOMATIC ROLL-UP DEVICE FOR SAFETY BELTS IN MOTOR VEHICLES

[75] Inventor: Artur Föhl, Schorndorf, Germany

[73] Assignee: Repa Feinstanzwerk GmbH, Alfdorf, Germany

[21] Appl. No.: 831,532

[22] Filed: Sep. 8, 1977

[51] Int. Cl.² ................ A62B 35/02; B65H 75/48
[52] U.S. Cl. .................................. 242/107; 64/1 V; 188/1 B; 242/107.4 R
[58] Field of Search .............. 242/54 R, 55, 67.1 R, 242/107–107.7; 64/1 V; 188/1 B; 74/574; 308/26

[56] References Cited
U.S. PATENT DOCUMENTS

| 856,228 | 6/1911 | Cromwell | 308/26 |
| 1,162,125 | 11/1915 | Bassett | 74/574 X |
| 3,670,980 | 6/1972 | Mukai et al. | 242/67.1 R |

Primary Examiner—Harvey C. Hornsby
Assistant Examiner—John M. Jillions
Attorney, Agent, or Firm—Herbert L. Lerner

[57] ABSTRACT

An automatic roll-up device for safety belts in motor vehicles with a winding shaft supported, with bearing play, in a bearing block and means to reduce undesirable noises due to rattling because of the play, involving a support roll which is supported resiliently in the axial direction and loads the winding shaft in the radial direction.

10 Claims, 8 Drawing Figures

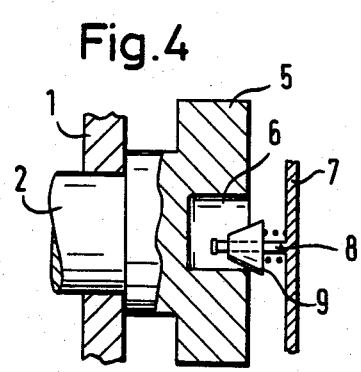
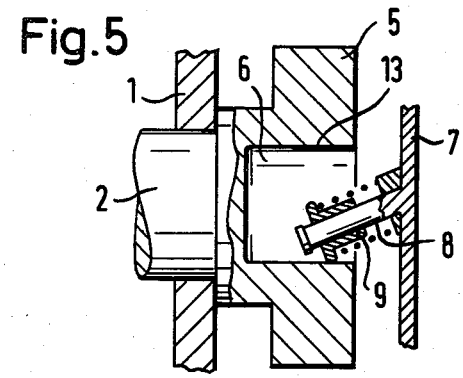
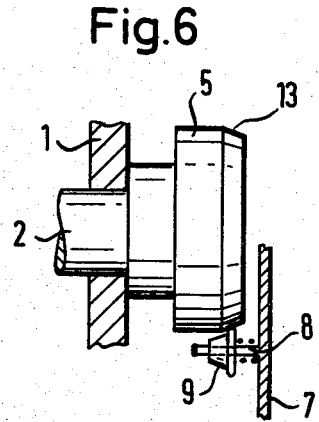
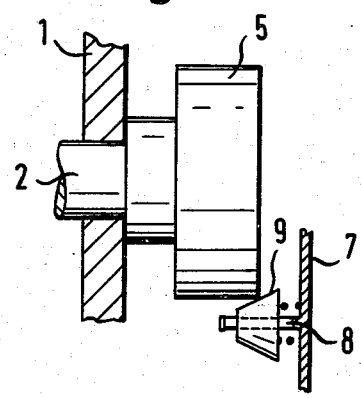
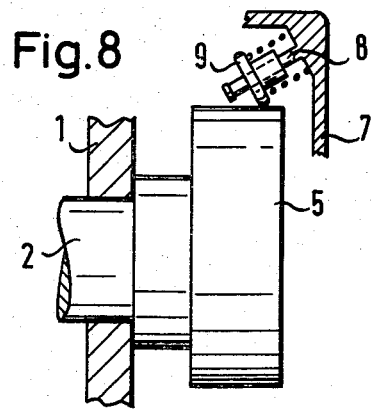

AUTOMATIC ROLL-UP DEVICE FOR SAFETY BELTS IN MOTOR VEHICLES

BACKGROUND OF THE INVENTION

1. Field of the Invention

This invention relates to an automatic roll-up device or winder for safety belts in motor vehicles with a winding shaft supported in a bearing block.

2. Description of the Prior Art

In the known automatic winders of the aforementioned type, the winding shaft is usually supported in a bearing block which consists of a part angled off in U-fashion.

It has been found in practice that even if the bearing surfaces are machined with great accuracy, the bearing friction increases due to different influences to values which make the reliable functioning of the automatic winder questionable.

It has now been attempted to correct this shortcoming by increasing the bearing play. While this measure led to an increase of the reliability, it resulted in undesirable noise due to rattling.

SUMMARY OF THE INVENTION

An object of the invention is to provide a roll-up device which eliminates these undesirable rattling noises without reducing the reliability of the device.

With the foregoing and other objects in view, there is provided in accordance with the invention an automatic roll-up device for safety belts in motor vehicles having a winding shaft supported, with bearing play, in a bearing block, including at least one support roll which is supported resiliently in the axial direction and disposed to load the winding shaft in the radial direction.

In a more specific embodiment there is provided an automatic roll-up device for safety belts in motor vehicles having a winding shaft supported, with bearing play, in a bearing block, including a rotating part rigidly coupled to the shaft, a housing enclosing the rotating part, an axle attached to the housing extending toward the rotating part, a support roll mounted on the axle with spring means urging the support roll away from the housing into engagement with the rotating part to exert pressure in the radial direction thereby minimizing rattling of the winding shaft.

Other features which are considered as characteristic for the invention are set forth in the appended claims.

Although the invention is illustrated and described herein as embodied in an automatic roll-up device for safety belts in motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 4 is a sectional view of an automatic winder with a cylindrical, blind opening and a conical support roll; and FIG. 5 is a sectional view of an automatic winder with a cylindrical, blind opening and a support roll arranged on an inclined axis of rotation; and FIG. 6 is a sectional view of an automatic winder with a conical running surface arranged at the outer circumference of a rotating part; and FIG. 7 is a sectional view of an automatic winder with a conical support roll engaging at the outer circumference of a rotating part; and FIG. 8 is a sectional view of an automatic winder with a support roll which engages at the outer circumference of a rotating part and is supported on an inclined axis of rotation.

DETAILED DESCRIPTION OF THE INVENTION

Figure 1:
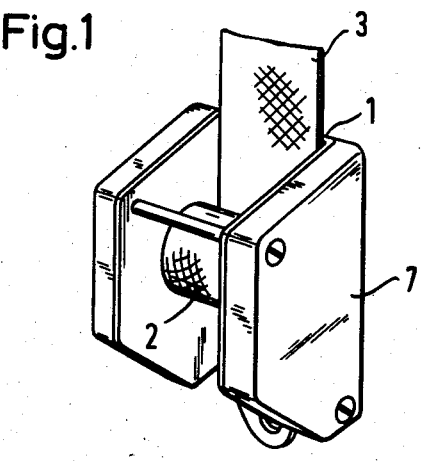
FIG. 1 is a perspective view of an automatic winder.

In accordance with the invention there is provided at least one support roll which is supported resiliently in the axial direction and loads the winding shaft unilaterally in the radial direction. Through this measure the winding shaft is always pressed resiliently at the same point of the bearing and nevertheless, enough bearing play remains to compensate influences which could lead to increased bearing friction.

In a preferred embodiment, the axis of rotation of the support roll is offset parallel to the winding shaft and the support roll and/or its running surface on the winding shaft is made conical. The support roll advantageously has a ring space which is open on one side in the axial direction and contains a pressure spring. This results in a particularly space-saving design. The axle of the support roll is arranged at a housing part of the automatic winder and is preferably formed thereon.

The running surface for the support roll may be arranged particularly in automatic winders which are provided with an unwind lock, at one end of the winding shaft which protrudes beyond the bearing, at a rotating part which is rigidly connected to the winding shaft and which can be part of the unwind lock. A space-saving design is obtained if the winding shaft or the rotating part connected thereto has at the end face a concentric blind opening into which the support roll is inserted, at least partially. However, the running surface for the support roll may be arranged at the outer circumference of the winding shaft or the rotating part connected thereto. The axis of rotation of the support roll may be arranged at an acute angle to the winding shaft. In that case, neither the support roll nor the support surface need be made conical.

In the drawing are illustrated examples of automatic winders designed in accordance with the invention.

Figure 2:
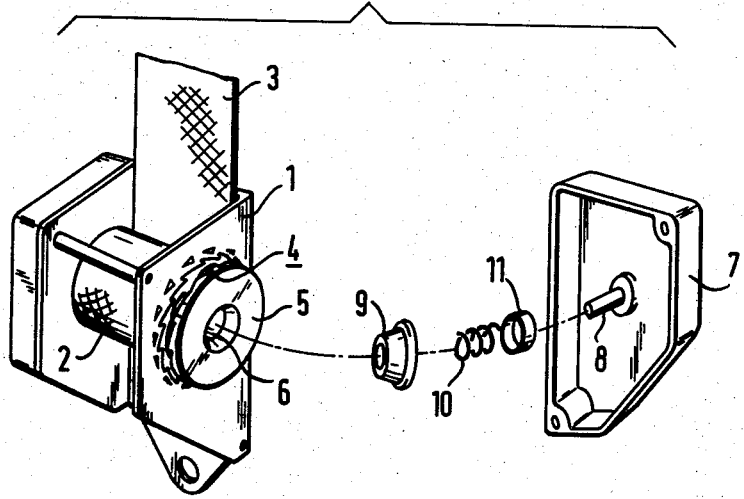
FIG. 2 is a view according to FIG. 1 with the cover on the side of the blocking device removed.

Referring to FIGS. 1 and 2, an automatic winder for safety belts is shown, which comprises a bearing block 1 bent in U-fashion for a winding shaft 2, onto which a safety belt 3 is wound. It is seen from FIG. 2 that a blocking device 4 is connected to the winding shaft 2 at an end protruding beyond the bearing block 1. This blocking device 4 has a rotating part 5 which is rigidly coupled to the winding shaft 2 and in which a concentric blind opening 6 is formed.

On the housing part 7, which covers the blocking device 4, there is formed on the inside an axle 8 for a support roll 9. Support roll 9 is movably supported on axle 8 against the force of a spring 10. The spring 10 is braced on one side against the support roll 9 and on the other side, against a bearing 11 which reduces the wear and rests against the housing 7.

Figure 3:
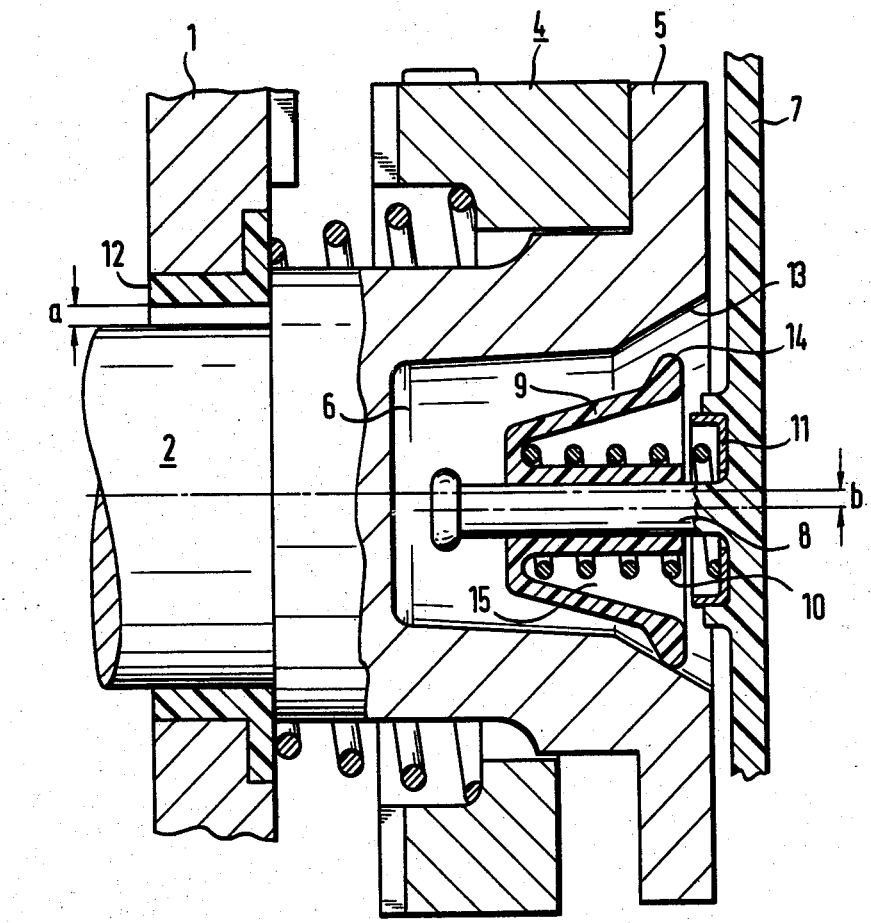
FIG. 3 is an enlarged section of the device shown in FIG. 2, showing a conical running surface in a blind opening.

FIG. 3 is an enlarged section from FIG. 2. The winding shaft 2 with the bearing play a is inserted into the bearing block 1, which has a bearing sleeve 12. The axle 8 of the support roll 9 is arranged offset parallel to the winding shaft 2 by the amount b. The blind cylindrical opening 6 has at its rim a conical running surface 13, which cooperates with the collar 14 of the support roll 9, into which a ring space 15 for receiving the pressure spring 10 is formed.

The collar 14 of the support roll 9 pushes the winding shaft 2, via the running surface 13 of the rotating part 5, unilaterally spring-loaded, against the bearing sleeve 12, and rattling is largely prevented thereby.

In FIGS. 4 to 8, further embodiment examples are shown schematically.

In the illustration according to FIG. 4, the rotating part 5 has a blind cylindrical hole 6 without a conically bevelled surface. In that case, the support roll 9 is then made conical. The support roll 9 is identical to that shown in FIG. 3.

Also in FIG. 5, a cylindrical, blind hole 6 without a conical running surface is formed into the rotating part 5. However, the axle 8 of the support roll 9 is arranged at an angle to the winding shaft 2 at the housing part 7. While in this case, the cylindrical surface of the blind hole 6 forms the running surface, the edge of the blind opening 6 fulfills this function in the embodiment of FIG. 4.

In FIGS. 6 to 9, the support roll 9 engages the outer region of the rotating part 5.

In the illustration according to FIG. 6, one edge 13 of the rotating part 5 is bevelled as a running surface. The winding shaft 2 and the axle 8 have parallel axes.

In the embodiment according to FIG. 7, the support roll 9 is conical as in FIG. 4 and runs on the outer rim of the rotating part 5.

In FIG. 8, an embodiment corresponding to FIG. 5 with an inclined axle for the support roll 9 is shown again, but which differs in that it runs on the outer cylindrical surface of the rotating part 5.

The embodiments shown in FIGS. 4 to 8 operate in the same manner as the embodiment of FIG. 3.

There are claimed:

1. In an automatic roll-up device for safety belts in motor vehicles having a winding shaft supported, with bearing play, in a bearing block, the improvement comprising at least one support roll mounted for rotation on an axle and driven by the winding shaft, a housing to which said axle is attached enclosing the support roll, spring means urging the support roll away from the housing into engagement with a running surface of the winding shaft to exert pressure on the winding shaft in the radial direction thereby minimizing rattling of the winding shaft.

2. Automatic roll-up device according to claim 1, wherein the winding shaft has at the end face a blind, concentric opening into which the support roll extends at least partially.

3. Automatic roll-up device according to claim 1, wherein the running surface for the support roll is arranged at the outer circumference of the winding shaft.

4. In an automatic roll-up device for safety belts in motor vehicles having a winding shaft supported, with bearing play, in a bearing block, the combination therewith of a rotating part rigidly coupled to the winding shaft, a housing enclosing the rotating part, an axle attached to the housing extending toward the rotating part, a support roll mounted for rotation on the axle and driven by the winding shaft with spring means urging the support roll away from the housing into engagement with a running surface of the rotating part rigidly coupled to the winding shaft to exert pressure on the winding shaft in the radial direction thereby minimizing rattling of the winding shaft.

5. Automatic roll-up device according to claim 4, wherein the axle of the support roll is disposed offset parallel to the winding shaft and the support roll has a conical running surface for said engagement with the running surface of the rotating part.

6. Automatic roll-up device according to claim 4, wherein the support roll has a ring space which opens in an axial direction away from the rotating part for receiving said spring means in said ring space.

7. Automatic roll-up device according to claim 4, wherein the axle of the support roll is disposed offset parallel to the winding shaft and the support roll is conical.

8. Automatic roll-up device according to claim 4, wherein the rotating part has at the end face a blind, concentric opening into which the support roll extends at least partially.

9. Automatic roll-up device according to claim 4, wherein the running surface for the support roll is arranged at the outer circumference of the rotating part.

10. Automatic winder according to claim 4, wherein the axle of the support roll is arranged at an acute angle to the winding shaft.

* * * * *